Dec. 25, 1951  N. R. CONANT  2,580,218
SHUTOFF COCK
Filed April 12, 1948
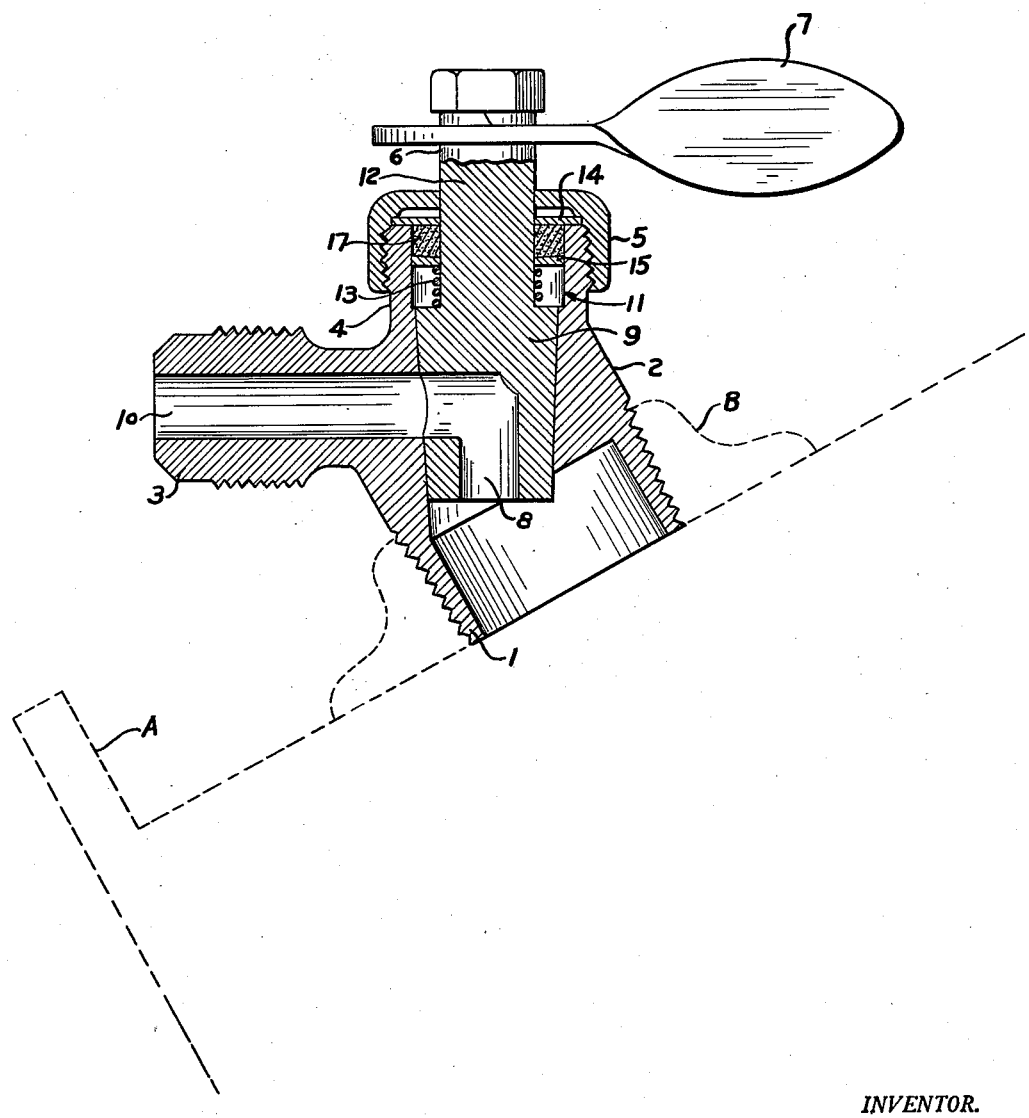
INVENTOR.
NEIL R. CONANT.
BY
ATTORNEY.

Patented Dec. 25, 1951

2,580,218

UNITED STATES PATENT OFFICE 2,580,218

SHUTOFF COCK

Neil R. Conant, Detroit, Mich., assignor to Anderson Brass Company, Detroit, Mich., a corporation of Michigan Application April 12, 1948, Serial No. 20,469

1 Claim. (Cl. 251—95)

This invention relates to valves the object being to provide a new and improved leak proof valve for use on fuel oil drums or tanks.

These and other features and objects of the invention are hereinafter more fully described and claimed and a valve embodying my invention is shown in the accompanying drawing in which—

The drawing is a section view of the valve as used in conjunction with a container or drum.

In the drawing the tank or drum is indicated by dotted lines A and the end of the drum is provided with a boss B having internal threads to fit the threads on the tapered end 1 of the valve body 2. The body 2 is provided with a longitudinally apertured extension 3 integral with the body and positioned at an angle to the longitudinal center line of the body. The body further has an extension 4 preferably at a right angle to the extension 3 and is threaded to receive a cap 5. The cap is centrally apertured and the stem 6 of the valve extends therethrough and on the end thereof is a lever 7 by means of which the valve may be rotated to permit or prevent flow of oil through the aperture of the extension 3.

When the valve is opened, the extension 3 is aligned with the end of the aperture 8 inside of the valve element 9 the aperture 8 opening through one end of the valve and at the opposite end is alignable with the passageway 10 in the extension 3 on the valve body.

In the cap 5 is a packing gland which comprises a plate 14 which seats on the threaded end 4 of the body and is centrally apertured to receive the valve stem 6. The stem 6 is of less diameter than the body of the valve element 9 thereby providing a recess 11 between the extension 4 of the body and stem 6 of the valve. A coiled spring 13 is positioned on the stem 6 of the valve and seats against the valve at one end and the opposite end seats on the apertured plate 15. A packing material 17 is positioned between the plate 15 and the end of the valve body. By this arrangement leakage of fluid between the cap 5 and the valve stem 6 is prevented.

It is believed obvious from the foregoing description and the drawing that the valve is of a simple and inexpensive character and that the various features and objects are attained by the structural character and relationship of the parts as hereinbefore described.

Having thus briefly described my invention, its utility and mode of operation, what I claim and desire to secure by Letters Patent of the United States is—

A valve comprising a body having an exteriorly threaded end for engagement in a threaded aperture of a liquid container, the body having a longitudinally apertured and exteriorly threaded extension on one side arranged at an obtuse angle to the longitudinal axis of said end to facilitate the attachment of a conduit coupling to said extension, said body also having an exteriorly threaded hollow end portion at right angles to said extension, an apertured cap threaded upon said end portion, an apertured plate supported within said cap and bearing against the outer end surface of said end portion, the body having a tapered seat, a tapered valve for seating thereon and having a stem extending through said end portion, said plate and said cap, a coiled spring about the valve stem with one end seating against the valve, a second apertured plate on the stem engaged by the other end of said spring, packing means surrounding said stem and interposed between the said plates, said valve having an L shaped passage providing communication with the aperture in said extension, and a lever upon the outer end of said stem for rotating said valve to control the flow of fluid through the longitudinally apertured extension.

NEIL R. CONANT.

REFERENCES CITED

The following references are of record in the file of this patent:

UNITED STATES PATENTS

| Number | Name | Date |
|---|---|---|
| 978,256 | Wright | Dec. 13, 1910 |
| 1,127,822 | Sturtevant | Feb. 9, 1915 |
| 2,127,679 | Dudley | Aug. 23, 1938 |

FOREIGN PATENTS

| Number | Country | Date |
|---|---|---|
| 69 | Great Britain | of 1885 |